(12) United States Patent
Suo et al.

(10) Patent No.: US 7,860,058 B2
(45) Date of Patent: Dec. 28, 2010

(54) INSERTING METHOD OF DOWNLINK COMMON PILOT

(75) Inventors: Shiqiang Suo, Shanghai (CN); Shaohui Sun, Shanghai (CN); Yingmin Wang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 156 days.

(21) Appl. No.: 12/088,533

(22) PCT Filed: Sep. 12, 2006

(86) PCT No.: PCT/CN2006/002358

§ 371 (c)(1),
(2), (4) Date: Jul. 30, 2008

(87) PCT Pub. No.: WO2007/036136

PCT Pub. Date: Apr. 5, 2007

(65) Prior Publication Data

US 2009/0129491 A1    May 21, 2009

(30) Foreign Application Priority Data

Sep. 29, 2005    (CN) .................... 2005 1 0106578

(51) Int. Cl.
H04W 4/00    (2009.01)
H04J 3/00    (2006.01)
H04J 4/00    (2006.01)
H04B 3/10    (2006.01)
H04L 12/43    (2006.01)

(52) U.S. Cl. ................ 370/330; 370/336; 370/491; 370/500; 370/458; 370/478

(58) Field of Classification Search ........... 370/203, 370/280, 330, 336, 337, 478, 491, 500, 395.4, 370/437, 477
See application file for complete search history.

(56) References Cited

U.S. PATENT DOCUMENTS

| | | | |
|---|---|---|---|
| 7,027,495 B2 * | 4/2006 | Demir et al. ............. 375/150 |
| 7,082,108 B2 * | 7/2006 | Hwang et al. ............ 370/311 |
| 7,200,124 B2 * | 4/2007 | Kim et al. ............... 370/324 |
| 7,333,824 B2 * | 2/2008 | Zhang et al. ............. 455/502 |
| 7,466,684 B2 * | 12/2008 | Chang .................... 370/350 |
| 7,542,450 B2 | 6/2009 | Li et al. |
| 2002/0196766 A1 * | 12/2002 | Hwang et al. ............ 370/342 |
| 2003/0076812 A1 * | 4/2003 | Benedittis ............... 370/350 |

(Continued)

FOREIGN PATENT DOCUMENTS

CN    1450742    10/2003

(Continued)

*Primary Examiner*—Ayaz R Sheikh
*Assistant Examiner*—Hoang-Chuong Q Vu
(74) *Attorney, Agent, or Firm*—Merchant & Gould P.C.

(57) ABSTRACT

The present invention discloses a method for inserting a downlink common pilot in a TDD system and more particularly to a method for inserting a downlink common pilot in a TDD system based on OFDMA technology and the method includes two steps. A: data to be transmitted are divided into several segments to be transmitted in several continuous time periods, wherein each time period includes several slots with at least one downlink slot; B: a common pilot is inserted in one downlink slot in the time period. Therefore, the scheduling based on the frequency domain can be achieved by measuring the common pilot channel.

5 Claims, 5 Drawing Sheets

U.S. PATENT DOCUMENTS

| | | | |
|---|---|---|---|
| 2003/0117980 A1* | 6/2003 | Kim et al. | 370/332 |
| 2005/0201319 A1* | 9/2005 | Lee et al. | 370/321 |
| 2005/0210364 A1* | 9/2005 | Kim | 714/781 |
| 2007/0054691 A1* | 3/2007 | Sankar et al. | 455/522 |
| 2009/0074098 A1* | 3/2009 | Wu et al. | 375/260 |

FOREIGN PATENT DOCUMENTS

| | | |
|---|---|---|
| CN | 1466286 | 1/2004 |
| CN | 1581999 | 2/2005 |
| WO | WO 2005/015920 A1 | 2/2005 |

\* cited by examiner

--Prior Art--

INSERTING METHOD OF DOWNLINK COMMON PILOT

FIELD

The present invention relates to mobile communication technology and specifically to a method for inserting a downlink common pilot in a radio frame, which is adaptive to a Time Division Duplex (TDD) system based on orthogonal frequency division multiple access (OFDMA) so that a scheduling based on frequency domain can be achieved by a measurement on a common pilot channel.

BACKGROUND

Currently, the 3rd Generation Partnership Project (3 GPP) is on the way in the long term evolution of 3 G mobile communication system and has determined to adopt the Orthogonal Frequency Division Multiplexing (OFDM) technology as the basic air interface technology. According to the OFDM technology, wide band of the system is divided into several narrow sub frequency bands. For example, if a system transmits data with a bandwidth of 20 MHz, the bandwidth can be divided into several to tens sub frequency bands, wherein each sub frequency band is of tens KHz to hundreds KHz and data are transmitted on each sub frequency band.

The Orthogonal Frequency Division Multiple Access (OFDMA) technology is a kind of multiple access technology which combines the OFDM technology with the Time Division Multiple Access (TDMA) technology and the Frequency Division Multiple Access (FDMA) technology, i.e. users are distinguished according to time and frequency.

In the communication system based on OFDMA, scheduling based on the frequency domain is a method which can effectively improve the communication performance. The main principle is that in the range of the whole system bandwidth, different users can select an optimal sub frequency band to transmit data according to their channel environment so that to realize the multi-user diversity. In order to perform the scheduling based on the frequency domain, the user needs to receive the downlink common pilot covering the whole system bandwidth, measure the channel quality of each sub frequency bandwidth, feed back the measurements to the base station and the base station performs the scheduling based on the frequency domain according to the measurements. It can be seen that the scheduling based on the frequency domain needs at least one transmission on the downlink and a subsequent transmission on the uplink, which is one scheduling time period.

In the TDD system based on the OFDMA, in order to realize the scheduling based on the frequency domain, i.e. the user may choose an optimal sub frequency band from the whole frequency band to perform the data transmission, a common pilot symbol should be transmitted in the downlink slot so that the user may perform the selection of the optimal sub frequency band.

Currently, in the long term 3 G evolution system, for the FDD (Frequency Division Duplex) system adopting the OFDMA based on the OFDM modulation, it uses a frame structure of 10 ms. As shown in FIG. 1, one frame includes 20 0.5 ms sub-frames (or slots), wherein each sub-frame (or slot) includes one downlink common pilot. The user may choose the optimal sub frequency band to transmit data according to these downlink common pilots.

However, the method of including a downlink common pilot in each slot is not adaptable to the TDD mode because for the TDD mode, each slot can both be used for the downlink and the uplink and only during the downlink transmission the downlink common pilot needs to be inserted; if several continuous slots are used for downlink transmission, the downlink common pilot needs to be inserted in only one downlink slot. Since there is a lack of the necessary uplink feedback, if the common pilot is inserted in each downlink slot, there would be too much system overhead.

SUMMARY

In order to achieve a scheduling based on a frequency domain for the TDD system based on OFDMA so that a user may choose an optimal sub frequency band from a whole frequency band to transmit data, a common pilot symbol needs to be transmitted in downlink so that the user may choose the optimal sub frequency band.

In order to achieve the above objective, the present invention provides a method for inserting a downlink common pilot, which is adaptable to the OFDMA TDD system based on OFDMA and includes steps of:

A: dividing data to be transmitted into several segments to be transmitted in several continuous time periods, each time period including several slots with at least one downlink slot;

B. inserting a common pilot in one downlink slot in the time period.

The time period includes slots in one or more frame.

In the above step A, the time period is a scheduling time period including at least one downlink slot and one uplink slot after the downlink slot, wherein each downlink slot in each frame of the data to be transmitted only belongs to one scheduling time period.

In the above step A, the time period is a prior scheduling time period including at least one downlink slot and one uplink slot with a last slot being an uplink slot, wherein each downlink slot in each frame of the data to be transmitted only belongs to one prior scheduling time period.

In the above step A, the time period is a minimum scheduling time period including at least one downlink slot and one uplink slot with any downlink slot being before any uplink slot, wherein each downlink slot in each frame of the data to be transmitted only belongs to one minimum scheduling time period.

When TDD system based on OFDMA adopts a same frame structure with TD-SCDMA system and when in each sub-frame of the TD-SCDMA system, normal slots TS0, TS4, TS5 and TS6 are downlink slots and TS1, TS2 and TS3 are uplink slots, TS4, TS5 and TS6 in each sub-frame and TS0, DwPTS, GP, UpPTS, TS1, TS2, and TS3 in a subsequent sub-frame are allocated into a time period and a downlink common pilot is inserted into one of the TS0 and DwPTS in each time period.

When TDD system adopts a same frame structure with TD-SCDMA system and when in each sub-frame of the TD-SCDMA system, general slots TS0, TS2, TS3, TS5, and TS6 are downlink slots and TS1 and TS4 are uplink slots, TS5 and TS6 in each sub-frame and TS0, DwPTS, GP, UpPTS, and TS1 in a subsequent sub-frame are allocated into a time period a and TS2, TS3, TS4 are allocated into a time period b, a downlink common pilot is inserted into one of the TS0 and DwPTS in the time period a and a downlink common pilot is inserted into the TS3 in the time period b.

When TDD system adopts a same frame structure with TD-SCDMA system and when in each sub-frame of the OFDMA TDD system, general slots TS0, TS2, TS4 and TS6 are downlink slots and TS1, TS3 and TS5 are uplink slots, TS6 in each sub-frame and TS0, DwPTS, GP, UpPTS and TS1 in a subsequent sub-frame are allocated into a time period c, TS2 and TS3 are allocated into a time period d, and TS4 and TS5 are allocated into a time period e, a downlink common pilot is inserted into one of the TS0 and DwPTS in the time period c, a downlink common pilot is inserted into the TS2 in the time period d and a downlink common pilot is inserted into the TS4 in the time period e.

The method of the present invention is adaptable to the TDD system based on OFDMA, wherein data to be transmitted are allocated into several segments to be transmitted in several continuous time periods with each time period including at least one downlink slot, and the common pilot is inserted into one downlink slot of the time period, so that the user may choose an optimal sub frequency band from the whole frequency band to transmit data with occupancy of little system resource.

DRAWINGS

Figure 9:
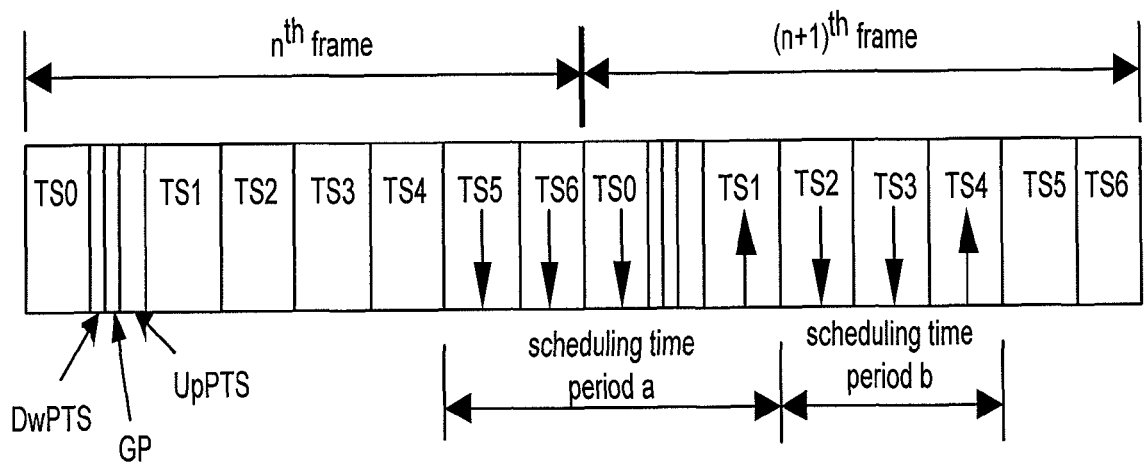
Figure 10:
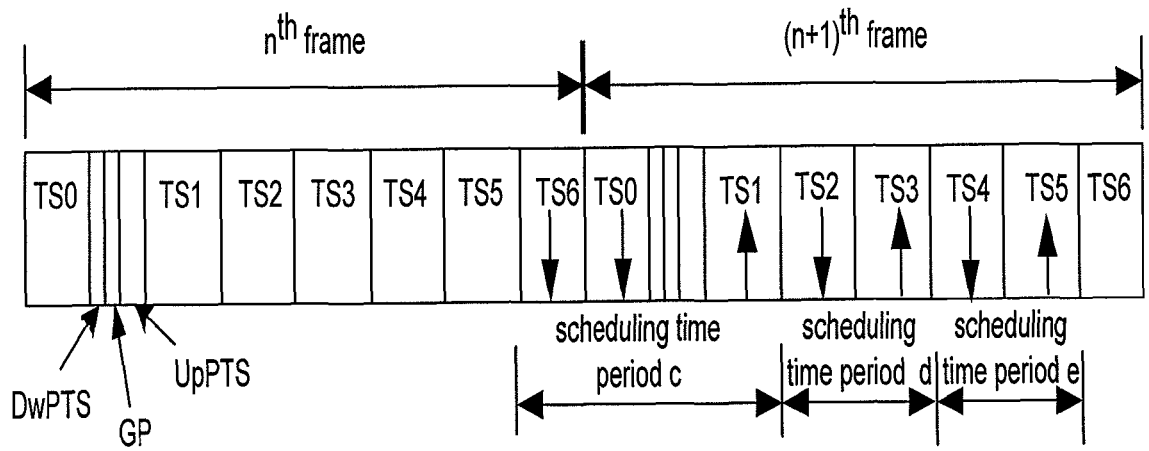

FIG. 9 is a schematic diagram showing the insertion of the downlink common pilot when the wireless sub-frame of the OFDMA TDD system which has a same frame structure with the TD-SCDMA system has 4 uplink/downlink switching points; and FIG. 10 is a schematic diagram showing the insertion of the downlink common pilot when the wireless sub-frame of the OFDMA TDD system which has a same frame structure with the TD-SCDMA system has 6 uplink/downlink switching points.

DETAILED DESCRIPTION

In order to better understand the solution of the present invention, a detail illustration will be made with reference to the accompanying drawings.

Figure 1:
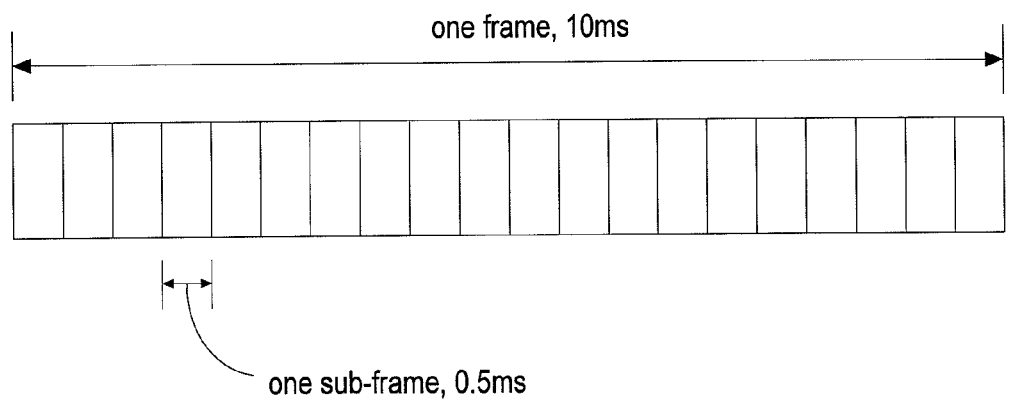
FIG. 1 is a schematic diagram showing a frame structure in a FDD mode in a long term evolution system of 3 G system.
Figure 2:
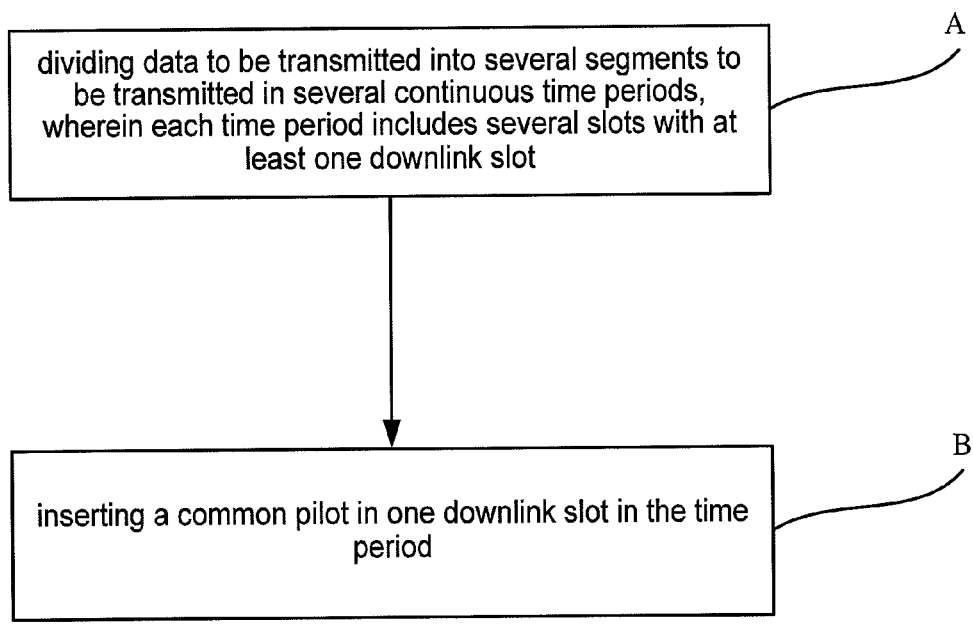
FIG. 2 is a flow chart showing a method of inserting a downlink common pilot according to the present invention.

The method of inserting a downlink common pilot according to the present invention is adaptable to the TDD system based on the OFDMA technology and includes the following steps, as shown in FIG. 2:

A. data to be transmitted are allocated into several segments to be transmitted in several continuous time periods, wherein each time period includes several slots with at least one downlink slot;

B. a common pilot is inserted in one downlink slot in the time period.

The time period includes slots in one or more frame.

In the above step A, the time period is a scheduling time period including at least one downlink slot and one uplink slot after the downlink slot, wherein each downlink slot in each frame of the data to be transmitted only belongs to one scheduling time period.

Figure 3:
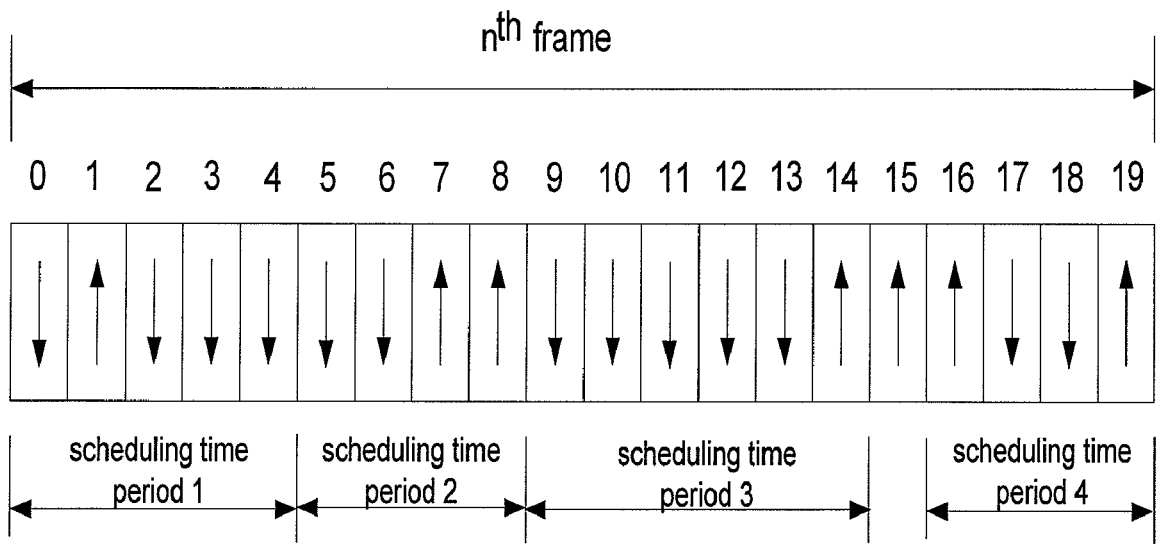
FIG. 3 is a schematic diagram showing an example of dividing and inserting the downlink common pilot according to a scheduling time period.

As shown in FIG. 3, a frame of the TDD mode is composed of 20 slots, wherein the 1st, 7th, 8th, 14th, 15th, 16th, 19th slots are uplink slots and the 0th, 2nd, 3rd, 4th, 5th, 6th, 9th, 10th, 11th, 12th, 13th, 17th, 18th slots are downlink slots.

The solution of dividing data to be transmitted into one or more segments to be transmitted in one or more scheduling time periods and of making each downlink slot of each frame of the data to be transmitted belongs and only belongs to one scheduling time period is as follows.

The 0th, 1st, 2nd, 3rd, 4th slots are allocated into the scheduling time period 1, the 5th, 6th, 7th, 8th slots are allocated in the scheduling time period 2, the 9th, 10th, 11th, 12th, 13th, 14th slots are allocated in the scheduling time period 3 and the 16th, 17th, 18th, 19th slots are allocated in the scheduling time period 4. It should be noted that the 15th slot is an uplink slot and doesn't need to be in any scheduling time period and the method of allocating scheduling time periods in FIG. 3 is not unique.

In the four scheduling time periods allocated in FIG. 2, one downlink slot is found in each scheduling time period according to the condition that after this downlink slot there is an uplink slot which belongs to the same scheduling time period with the downlink slot. The 0th slot in the scheduling time period 1, the 5th slot in the scheduling time period 2, the 11th slot in the scheduling time period 3, the 18th slot in the scheduling time period 4 conform to this condition, therefore the downlink common pilot can be inserted in these four slots.

In the above step A, the time period is a prior scheduling time period including at least one downlink slot and one uplink slot with a last slot being an uplink slot, wherein each downlink slot in each frame of the data to be transmitted only belongs to one prior scheduling time period.

Figure 4:
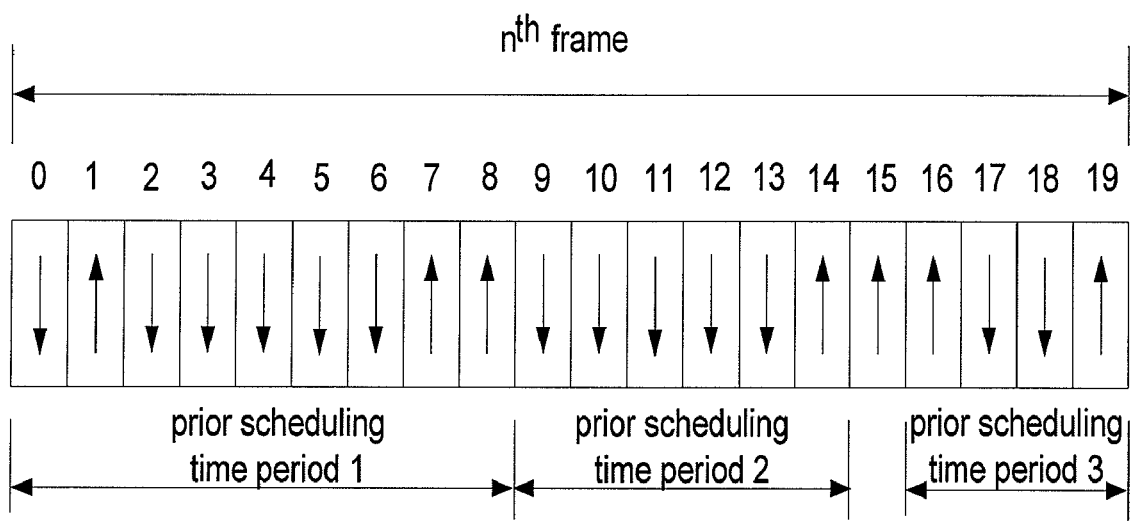
FIG. 4 is a schematic diagram showing an example of dividing and inserting the downlink common pilot according to a prior scheduling time period.

The frame structure shown in FIG. 4 is the same with that shown in FIG. 3. However, the method of allocating scheduling time period in FIG. 3 is not adaptable to the definition of the prior scheduling time period since the last slot in the scheduling time period 1 in FIG. 2 is a downlink slot while the last slot in the prior scheduling time period should be an uplink slot.

The solution of allocating data to be transmitted into one or more segments in one or more prior scheduling time periods and of making each downlink slot of each frame of the data to be transmitted belongs and only belongs to one prior scheduling time period is as follows. The 0th, 1st, 2nd, 3rd, 4th, 5th, 6th, 7th, 8th slots are allocated in the prior scheduling time period 1, the 9th, 10th, 11th, 12th, 13th, 14th slots are allocated in the prior scheduling time period 2 and the 16th, 17th, 18th, 19th slots are allocated in the prior scheduling time period 3. It should be noted that the 15th slot is an uplink slot and doesn't need to be in any prior scheduling time period and the method of allocating prior scheduling time periods in FIG. 4 is not unique.

Since the last slot in the prior scheduling time period is an uplink slot, any downlink slot in the prior scheduling time period meets the condition that after this downlink slot there is an uplink slot which belongs to the same prior scheduling time period with the downlink slot.

In the three prior scheduling time periods allocated in FIG. 4, one downlink slot is found in each prior scheduling time period according to the condition that after this downlink slot there is an uplink slot which belongs to the same prior scheduling time period with the downlink slot and the interval between the downlink slot and the uplink slot immediately after the downlink slot is minimum. The 6th slot in the prior scheduling time period 1, the 13th slot in the prior scheduling time period 2, the 18th slot in the prior scheduling time period 3 conform to this condition, therefore the downlink common pilot can be inserted in these three slots.

In the above step A, the time period is a minimum scheduling time period including at least one downlink slot and one uplink slot with any downlink slot ahead of any uplink slot, wherein each downlink slot in each frame of the data to be transmitted only belongs to one minimum scheduling time period.

Figure 5:
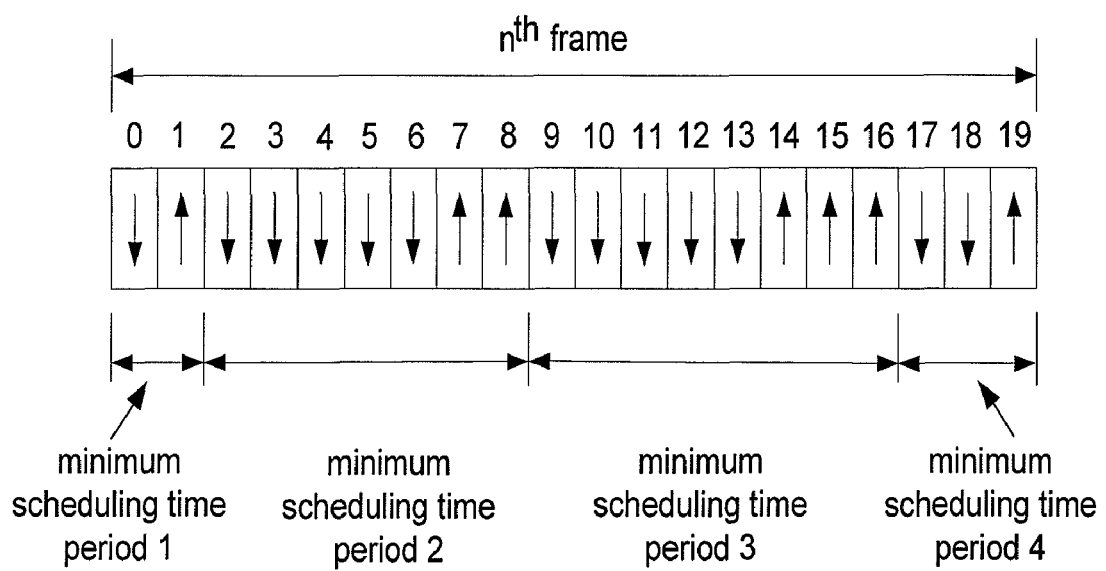
FIG. 5 is a schematic diagram showing an example of dividing and inserting the downlink common pilot according to a minimum scheduling time period.

The frame structure shown in FIG. 5 is the same with that shown in FIG. 3. The solution of allocating data to be transmitted into one or more segments to be transmitted in one or more minimum scheduling time periods and of making each downlink slot of each frame of the data to be transmitted belongs and only belongs to one minimum scheduling time period is as follows. The 0th, 1st slots are allocated in the minimum scheduling time period 1, the 2nd, 3rd, 4th, 5th, 6th, 7th, 8th slots are allocated in the minimum scheduling time period 2, the 9th, 10th, 11th, 12th, 13th, 14th, 15th, 16th slots are allocated in the minimum scheduling time period 3 and the 17th, 18th, 19th slots are allocated in the minimum scheduling time period 4. It should be noted that the method of allocating minimum scheduling time periods in FIG. 5 is not unique.

In the four minimum scheduling time periods allocated in FIG. 5, one downlink slot is found in each minimum scheduling time period according to the condition that after this downlink slot there is an uplink slot which belongs to the same minimum scheduling time period with the downlink slot and the interval between the downlink slot and the uplink slot immediately after the downlink slot is minimum. The 0th slot in the minimum scheduling time period 1, the 6th slot in the minimum scheduling time period 2, the 13th slot in the minimum scheduling time period 3 and the 18th slot in the minimum scheduling time period 4 conform to this condition, therefore the downlink common pilot can be inserted in these four slots.

In the long term evolution system of 3 G system, the frame structure of TD-SCDMA can be combined with the OFDMA technology, i.e. the TDD system based on OFDMA can use the same frame structure as the TD-SCDMA system.

Figure 6:
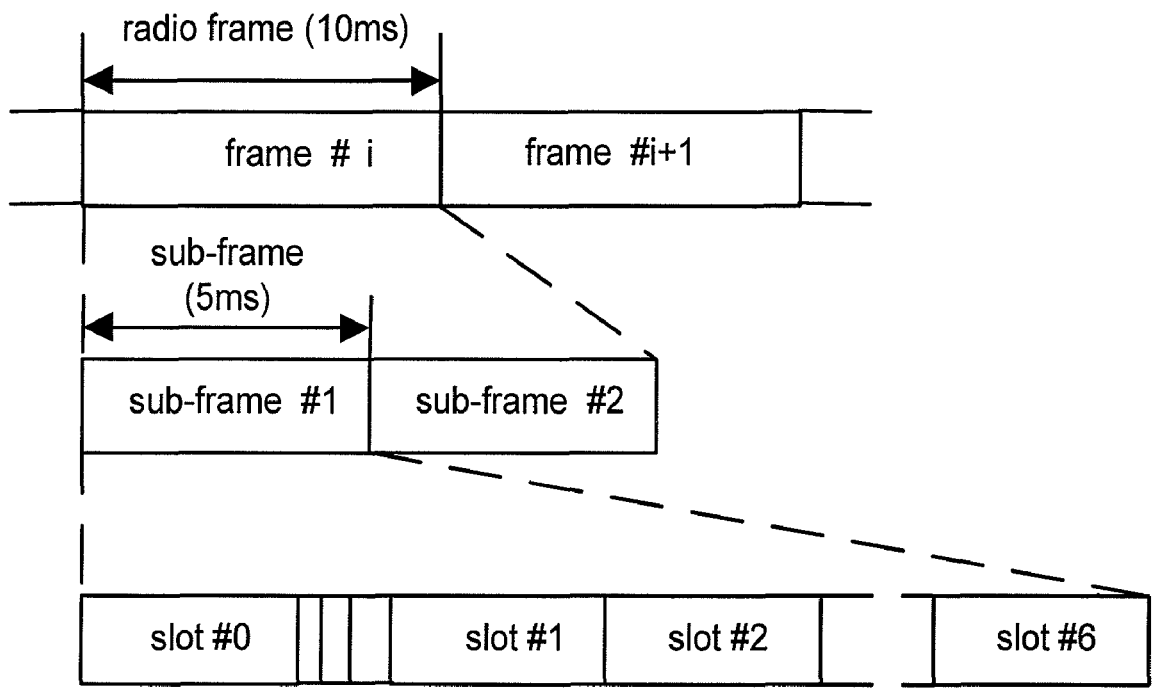
FIG. 6 is a schematic diagram showing a frame structure of TD-SCDMA system.

FIG. 6 is a schematic diagram showing a frame structure of TD-SCDMA system. As shown in FIG. 6, the length of the frame of TD-SCDMA system is 10 ms and each frame is divided into two 5 ms radio sub-frames.

Figure 7:
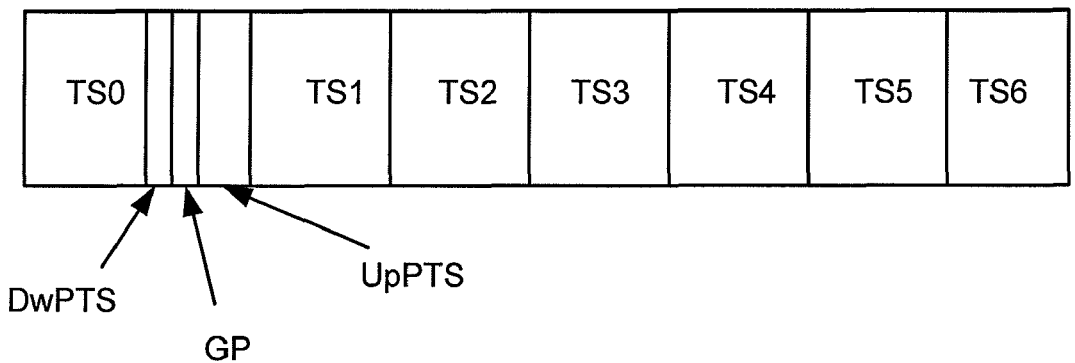
FIG. 7 is a schematic diagram showing a radio sub-frame structure of TD-SCDMA system.

FIG. 7 is a schematic diagram showing a radio sub-frame structure of TD-SCDMA system. Each radio sub-frame is composed by 7 normal slots (TS0~TS6) and 3 special slots. The 3 special slots are DwPTS (Downlink Pilot Timeslot, for transmitting downlink synchronous information of the system), UpPTS (Uplink Pilot Timeslot, for transmitting uplink synchronous information of the user access) and GP (Guard Period, for providing time interval for switching between the downlink transmission slot and the uplink transmission slot) respectively.

Figure 8:
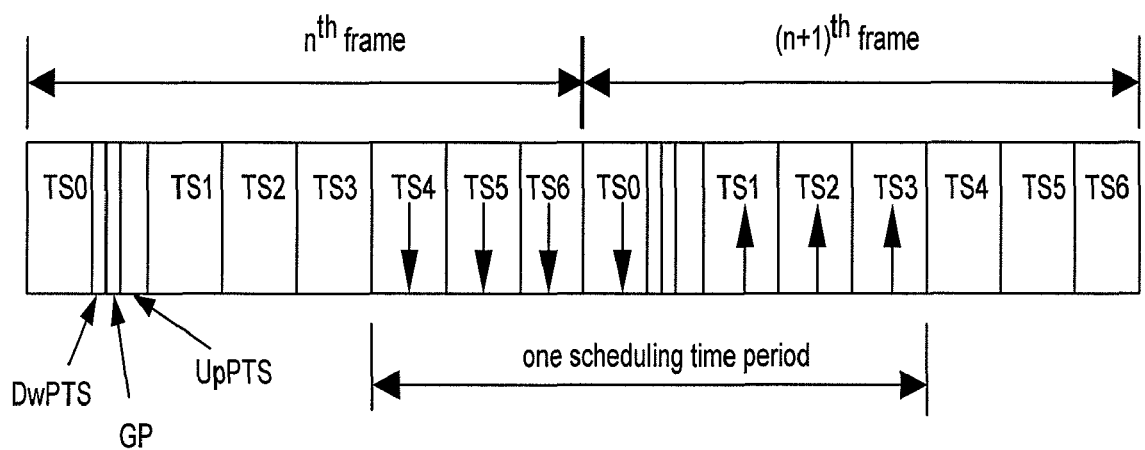
FIG. 8 is a schematic diagram showing the insertion of the downlink common pilot when the radio sub-frame of the OFDMA TDD system which has a same frame structure with the TD-SCDMA system has 2 uplink/downlink switching points.

FIG. 8 is a schematic diagram showing an embodiment of inserting the downlink common pilot when the radio sub-frame of the OFDMA TDD system which has a same frame structure with the TD-SCDMA system has 2 uplink/downlink switching points.

In this embodiment, TS0, TS4, TS5 and TS6 in each sub-frame are downlink slots and TS1, TS2 and TS3 are uplink slots. TS4, TS5 and TS6 in each sub-frame and TS0, DwPTS, GP, UpPTS, TS1, TS2, TS3 in a subsequent sub-frame are allocated into a scheduling time period and a downlink common pilot is inserted into TS0 or DwPTS in each scheduling time period. It should be noted that DwPTS is a downlink slot, therefore a downlink common pilot can be inserted in the DwPTS. Specifically, when the downlink slot in the scheduling time period meets the condition that after this downlink slot there is an uplink slot which belongs to the same prior scheduling time period with the downlink slot and the interval between the downlink slot and the uplink slot immediately after the downlink slot is minimum, the downlink common pilot should be inserted in the DwPTS.

FIG. 9 is a schematic diagram showing an embodiment of inserting the downlink common pilot when the radio sub-frame of the OFDMA TDD system which has a same frame structure with the TD-SCDMA system has 4 uplink/downlink switching points.

In this embodiment, slots TS0, TS2, TS3, TS5, and TS6 in each sub-frame are downlink slots and TS1 and TS4 are uplink slots. TS5 and TS6 in each sub-frame and TS0, DwPTS, GP, UpPTS, TS1 in a subsequent sub-frame are allocated into a scheduling time period a and TS2, TS3, TS4 are allocated into a scheduling time period b, a downlink common pilot can be inserted into the TS0 or DwPTS in the scheduling time period a and a downlink common pilot can be inserted into the TS3 in the scheduling time period b.

FIG. 10 is a schematic diagram showing an embodiment of inserting the downlink common pilot insert when the radio sub-frame of the OFDMA TDD system which has a same frame structure with the TD-SCDMA system has 6 uplink/downlink switching points.

In this embodiment, slots TS0, TS2, TS4 and TS6 in each sub-frame are downlink slots and TS1, TS3 and TS5 are uplink slots. TS6 in each sub-frame and TS0, DwPTS, GP, UpPTS, TS1 in a subsequent sub-frame are allocated into a scheduling time period c, TS2 and TS3 are allocated into a scheduling time period d, and TS4 and TS5 are allocated into a scheduling time period e, a downlink common pilot can be inserted into the TS0 or DwPTS in the scheduling time period c, a downlink common pilot can be inserted into the TS2 in the scheduling time period d and a downlink common pilot can be inserted into the TS4 in the scheduling time period e.

The above are preferred embodiments of the present invention and they are not intended to limit the present invention. It is intended that the modifications, variations and improvements of this invention can be made without departing from the spirit and principle of the present invention.

What is claimed is:

1. A method for inserting a downlink common pilot, which is adaptable to the OFDMA TDD system and comprises steps of:

A: dividing data to be transmitted into several segments to be transmitted in several continuous time periods, each time period comprising several slots with at least one downlink slot; and B: inserting a common pilot in one downlink slot in the time period;

wherein the time period comprises slots in one or more frame;

wherein when TDD system adopts a same frame structure with TD-SCDMA system and when in each sub-frame of the TD-SCDMA system, normal slots TS0, TS2, TS3, TS5, and TS6 are downlink slots and TS1 and TS4 are uplink slots, TS5 and TS6 in each sub-frame and TS0, DwPTS, GP, UpPTS, and TS1 in a subsequent sub-frame are allocated into a time period a and TS2, TS3, TS4 are allocated into a time period b, a downlink common pilot is inserted into one of the TS0 and DwPTS in the time period a and a downlink common pilot is inserted into the TS3 in the time period b;

wherein when TDD system adopts a same frame structure with TD-SCDMA system and when in each sub-frame of the OFDMA TDD system, normal slots TS0, TS2, TS4 and TS6 are downlink slots and TS1, TS3 and TS5 are uplink slots, TS6 in each sub-frame and TS0, DwPTS, GP, UpPTS and TS1 in a subsequent sub-frame are allocated into a time period c, TS2 and TS3 are allocated into a time period d, and TS4 and TS5 are allocated into a time period e, a downlink common pilot is inserted into one of the TS0 and DwPTS in the time period c, a downlink common pilot is inserted into the TS2 in the time period d and a downlink common pilot is inserted into the TS4 in the time period e.

2. The method according to claim 1, wherein in step A, the time period is a scheduling time period including at least one downlink slot and one uplink slot after the downlink slot, wherein each downlink slot in each frame of the data to be transmitted only belongs to one scheduling time period.

3. The method according to claim 1, wherein in step A, the time period is a prior scheduling time period including at least one downlink slot and one uplink slot with a last slot being an uplink slot, wherein each downlink slot in each frame of the data to be transmitted only belongs to one prior scheduling time period.

4. The method according to claim 1, wherein in step A, the time period is a minimum scheduling time period including at least one downlink slot and one uplink slot with any downlink slot being before any uplink slot, wherein each downlink slot in each frame of the data to be transmitted only belongs to one minimum scheduling time period.

5. The method according to claim 1, wherein when TDD system based on OFDMA adopts a same frame structure with TD-SCDMA system and when in each sub-frame of the TD-SCDMA system, normal slots TS0, TS4, TS5 and TS6 are downlink slots and TS1, TS2 and TS3 are uplink slots, TS4, TS5 and TS6 in each sub-frame and TS0, DwPTS, GP, UpPTS, TS1, TS2, and TS3 in a subsequent sub-frame are allocated into a time period and a downlink common pilot is inserted into one of the TS0 and DwPTS in each time period.

* * * * *